United States Patent [19]
Keep, Jr.

[11] 3,774,013
[45] Nov. 20, 1973

[54] HEAT TREATING APPLIANCE FOR STRESS-RELIEVING STEEL PIPING AND LIKE STRUCTURES

[76] Inventor: Henry Keep, Jr., 314 Elizabeth Ave., Cranford, N.J. 07016

[22] Filed: Nov. 13, 1972

[21] Appl. No.: 305,919

[52] U.S. Cl............... 219/535, 174/113, 219/530, 219/537, 219/550, 338/214
[51] Int. Cl. ......................................... H05b 3/58
[58] Field of Search................... 219/528, 530, 535, 219/537, 540, 545, 549, 550; 338/213, 214, 338/268; 174/113

[56] References Cited
UNITED STATES PATENTS

| | | | |
|---|---|---|---|
| 2,492,397 | 12/1949 | Peterson | 219/530 X |
| 3,393,297 | 7/1968 | Hart | 219/528 |
| 3,454,747 | 7/1969 | Hart | 219/549 |
| 3,694,628 | 9/1972 | McGuire et al. | 219/535 X |
| 2,529,914 | 11/1950 | Challonner | 219/528 X |
| 3,153,140 | 11/1964 | Theodore et al. | 219/549 |
| 3,209,128 | 9/1965 | Chapman, Jr. | 219/528 |
| 3,217,280 | 11/1965 | Norton | 338/268 |

Primary Examiner—Volodymyr Y. Mayewsky
Attorney—Albert C. Johnston

[57] ABSTRACT

A heat treating appliance wrappable about welded steel pressure piping and like structures for relieving stresses therein and coilable to compact form for storage and transport comprises lengths of a pliable electrical heating cable held in parallel relation by and along an elongate flexible reticular support such as a long sleeve knitted of heat-resistant wire, with means on the ends of electrical resistance wires in the cable lengths for connecting them in parallel with a source of electric current. Each cable length preferably comprises a single solid strand of a Cr-Ni alloy resistance wire sheathed within several braided insulating layers of amorphous silica fiber, with an armor layer of heat resistant Ni-Cr alloy wire braided over the insulating sheath. By the use of a suitable number of the heating appliances wrapped about the stressed regions, steel pressure piping ranging from 2 inches to 48 inches in O.D. and from ¼ inch to 5½ inches in wall thickness can be readily subjected to normalizing treatment at an appropriate temperature between about 1,100° and 1,800° and thus relieved of stresses in regions near welded joints thereof.

8 Claims, 5 Drawing Figures

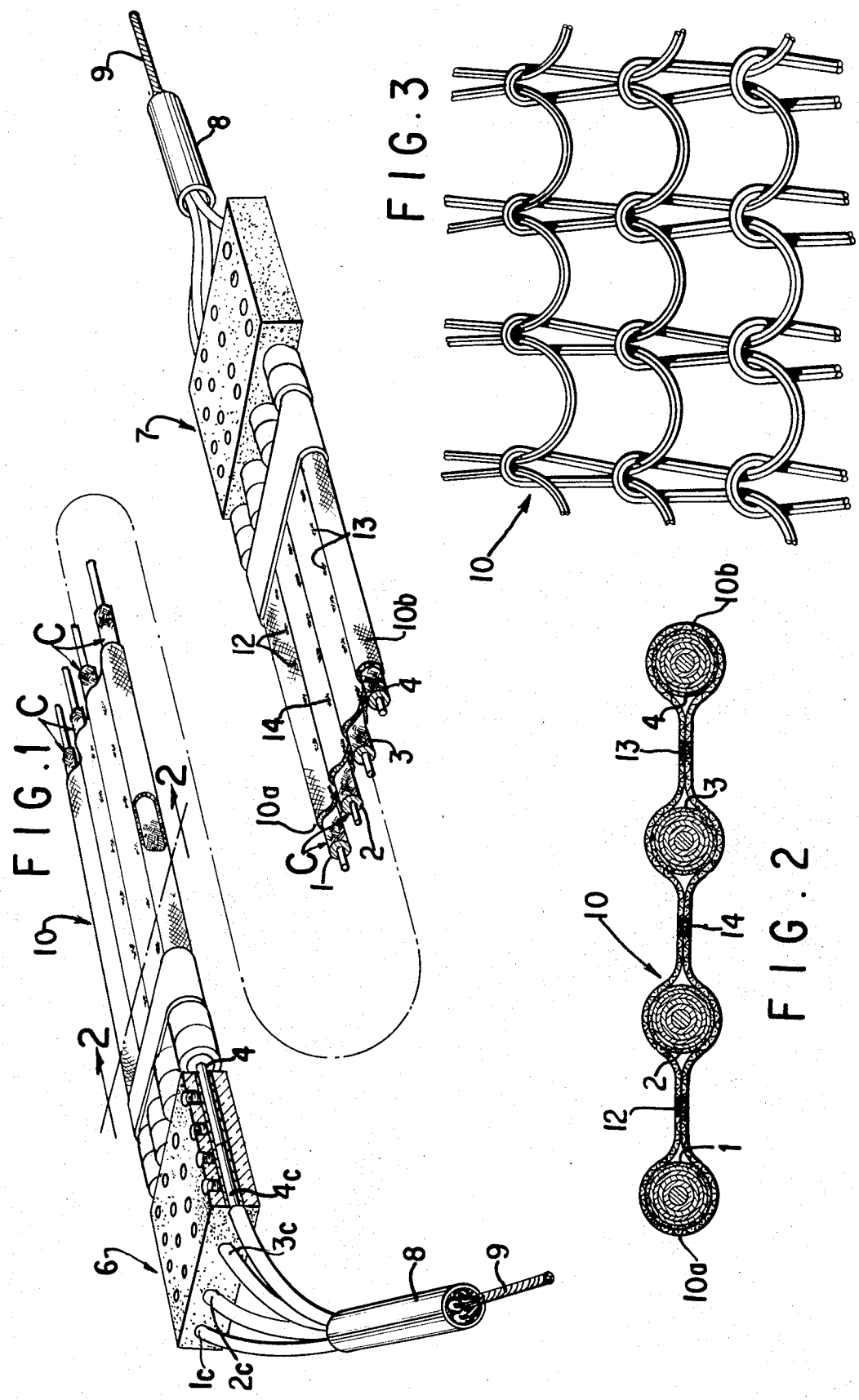

HEAT TREATING APPLIANCE FOR STRESS-RELIEVING STEEL PIPING AND LIKE STRUCTURES

This invention relates to a heating appliance useful for local heat treatment of steel piping and like metal structures, such as for relieving stresses developed in the structures by welding operations. The invention relates also to a pliable electrical heating cable provided for use as a part of the heating appliance.

Pressure resistant piping of the kind used for conducting superheated steam, petroleum products or other fluids under pressure is often installed by welding together the ends of separate pipe sections at the place of installation. Piping of this kind ranges in size from as small as about 2 inches to as large as 48 inches or even more in outside diameter, and the pipe walls range from as little as about ¼ inch up to about 5 ½ inches in thickness.

When the pipe sections are welded together, stresses which weaken their wall structure are likely to develop in regions of the piping near the welds. It is of course important to avoid locally stressed regions in the finished piping, and this generally is accomplished by localized heat treatment of the wall structures near the welds. The heat treatment effects a normalizing of the stressed metal, restoring its normal ductility. It generally is carried out for a period of hours, with gradual heating of the structure to and controlled cooling of it from a selected temperature in the range of about 1,100° to 1,800° F., depending upon the composition of the steel. For instance, the temperature specified for stress relieving pressure piping is 1,150° F. in the case of pipe made of straight carbon steel (A.S.M.E. P1 material), and is 1,350° F. in case of pipe made of chromium-molybdenum steel (A.S.M.E. P5 material).

It has been a common practice to bring the pipe to the required normalizing temperature by means of a number of electrical heating mats applied to the stressed regions and connected in parallel with a suitable source of electric current, such as the current output terminals of a conventional pipe welding machine. These heating mats have, for example, dimensions of about 7 inches by 15 inches and are each made of a length of armored electrical resistance wire doubled upon itself and held in a serpentine disposition by strands of a wide-mesh woven wire support. The application of such mats to the piping or like structure to be heated and the wiring of them in parallel are objectionably cumbersome and time-consuming operations, and especially so where piping of large diameter is to be heat treated.

It is known that some of the deficiencies of the use of such heating mats may be avoided by the use of elongate heating appliances having a certain coilable band-like structure. In this known structure, several parallel lengths of an electrical conductor suitable for resistance heating extend through a large number of ceramic spacer bars which are fitted together edgewise, each nesting with yet turnable relative to another, so that the assembly can be flexed in one direction transverse to its longitudinal axis. The assembly thus can be coiled for storage or transportation and can be wrapped about and strapped to a pipe section, and its conductors connected in parallel to a source of current, for local stress-relieving treatment of the piping. This known appliance, however, possesses little or no lateral flexibility; so it can be applied for use only in limited manner. Moreover, the ceramic spacer bars which form its body are objectionably limited in heat conductivity, and, above all, they are a source of frequent trouble due to their brittleness and limited strength which result in frequent breaking of them under the stresses of use.

The principal object of the present invention is to provide a new and improved heating appliance useful for local heat treatment of pressure piping and like metal structures, such as for preventing or relieving stresses in local regions of the metal walls, by which the practical deficiencies and disadvantages of the appliances heretofore known for such purposes may be overcome.

Another object of the invention is to provide an improved electrical heating cable structure for use as a part of the new heating appliance.

According to the present invention, a plurality of lengths of a pliable electrical heating cable are disposed along and held in substantially parallel relation by an elongate flexible support of reticular form which is flexible in all directions transverse to its longitudinal axis and is resistant to all the temperatures at which the heat treatments may be effected; and the respective electrical resistance wires of the cable lengths are connected in parallel at each end thereof through suitable means, such as terminal blocks having highly conductive wires extending thereinto, whereby they may be readily brought into a circuit supplying an electric current for the heating to be effected by use of the appliance.

The elongate flexible reticular support advantageously is a long knitted sleeve, or tube, made by loose knitting of a heat resistant wire such, for example, as an "Inconel" No. 601 nickel-chromium alloy wire. The lengths of heating cable are disposed and held in parallel relation between and along opposite knitted wall sections of the sleeve, which sections are joined together along longitudinal regions thereof between the cable lengths, as by means of welds formed at intervals along these regions, so that the cable lengths are held laterally spaced apart each at a desired distance from another within the sleeve.

The elongate flexible heating appliance thus provided embodies several practical functions and advantages for the stated purposes. It can be coiled easily to a quite compact form for storage and for transport to a location of use. It can be applied readily for heat treatment of a local region of a steel pipe or like structure, by simply being wrapped spirally about and strapped in place on the region to be treated. Moreover, it serves efficiently for heating the local region that if covers to any selected temperature in the range of about 1,100° to 1800° F., or even to a higher temperature if desired, and does so with little or no risk of becoming broken, burned out or otherwise damaged over prolonged periods of recurrent uses.

As a further feature of the invention, a special construction of the electrical heating cable is provided for use in the required lengths as a part of the heating appliance. The resistance heating element of this cable is a single solid strand of an alloy wire suited for being heated by its electrical resistance to a temperature well above the range of heat treating temperatures for which the appliance is adapted. The resistance wire is encased within an electrically insulating sheath which, in order to assure excellent electrical insulation yet also to provide good heat conduction, is composed of several superimposed layers of amorphous silica fiber braided upon the conductor. Finally, for protection of the insulating sheath against physical injury or deterioration, a shielding layer composed of an alloy wire highly resistant to heat and oxidation is braided over the insulating sheath.

The cable thus constituted provides a combination of properties especially advantageous for the purposes of the invention, including the required resistance heating capability, pliability suited for the required wrappability and coilability of the appliance, good heat conduction, excellent electrical insulation for safety of use, and strength and corrosion resistance properties which render it resistant to and durable under both the manipulative stresses and the extreme thermal stresses to which the appliance is subjected in recurrent uses.

The foregoing and other objects, features and advantages of the invention will be further evident from the following detailed description and the accompanying drawings of an illustrative embodiment thereof.

In the drawings:

FIG. 1 is a perspective view, partly broken away, of a heating appliance embodying the invention;

FIG. 2 is a transverse cross-sectional view thereof on an enlarged scale;

FIG. 3 is a fragmentary perspective view, partly in section, of the reticular, or open wire mesh structure of the flexible support of the appliance;

Figures 4, 5:
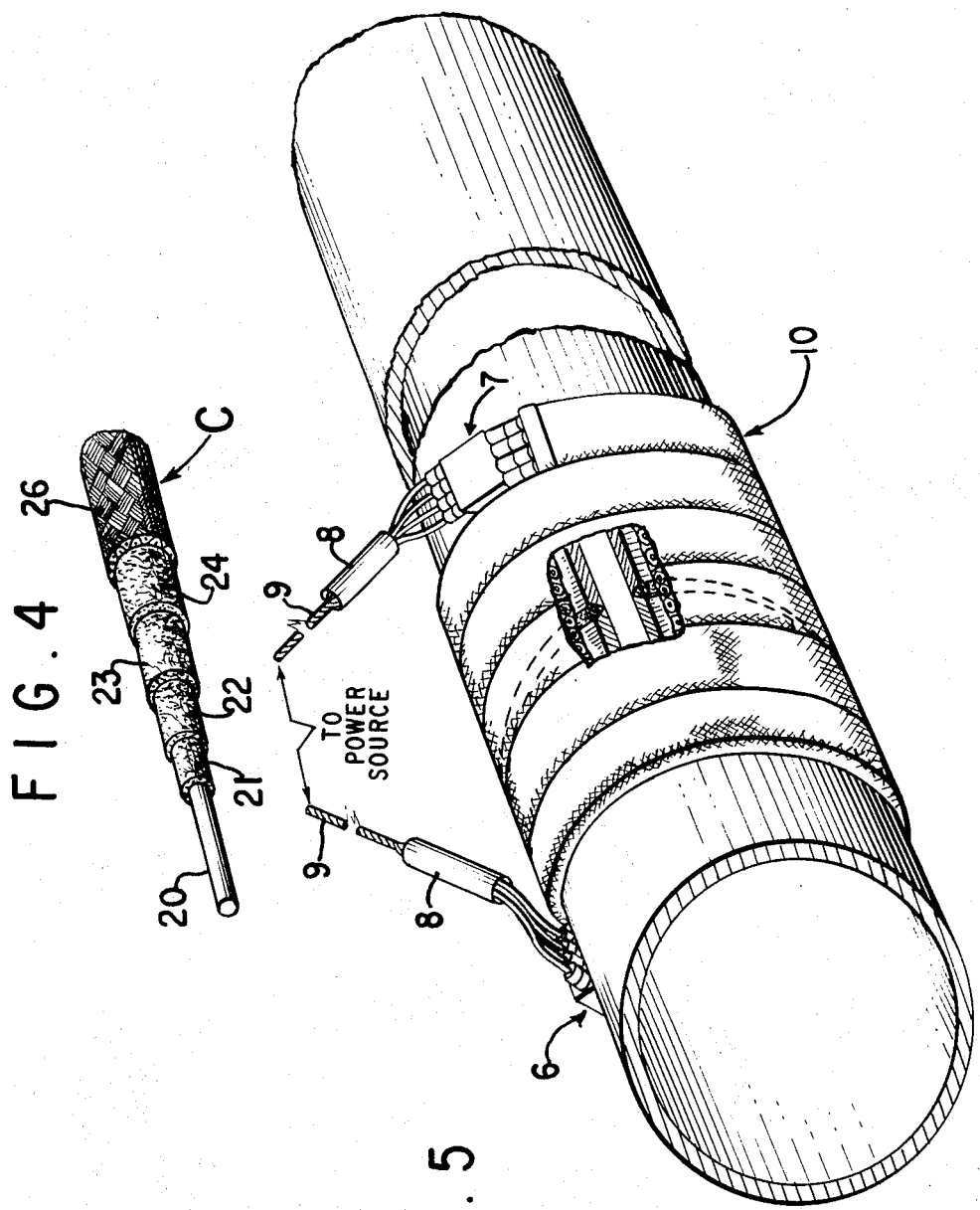
FIG. 4 is a fragmentary perspective view, partly in section, of a portion of the electrical heating cable used in the appliance.
FIG. 5 is a perspective view showing the heating appliance wrapped spirally about a section of steel pipe, substantially as it is applied for heat treatment of the stressed regions of a pipe next to a welded joint thereof.

In the illustrated embodiment of the invention an elongate flexible reticular support 10 carries four lengths 1, 2, 3 and 4 of a pliable, high-temperature electrical heating cable C, which are held in substantially parallel relation by and along the support. The support 10 has the form of a long wire mesh sleeve, or tube, composed of knitted double strands of nickel-chromium alloy wire, such as 0.011 inch diameter wire of "Inconel" No. 601 alloy. A suitable knitted open mesh wall structure of this sleeve is illustrated in FIG. 3. The support accordingly is freely flexible in any direction.

Depending upon the size of the pipe or other metal structure to be treated by use of the appliance, there may be two, three, four, or even a larger number, of the cable lengths held by a reticular support of appropriate width. Also depending upon the size of the piping or other structure to be heat treated by its use, the appliance may be made with a convenient length, such, for example, as 12 feet, 16 feet or 20 feet, which enables it to be wrapped spirally about a pipe in more than one full convolution thereupon, for instance as illustrated in FIG. 5, yet also to be coiled to a compact form for simplicity of storing and transporting the appliance.

In making the appliance shown, the two outer lengths 1 and 4 of the heating cable are placed within the support sleeve 10 and spread apart therein to the extent permitted by the girth of the sleeve, whereupon the opposite knitted wall sections 10a and 10b of the sleeve are joined together in regions 12 and 13 extending therealong adjacent to the inner sides of these cable lengths. The sleeve walls preferably are so joined by having their meshes welded together, as by resistance welding, at intervals along those regions. The two inner lengths 2 and 3 of the heating cable then are placed within the sleeve 10 inside the joined wall regions thereof adjacent to the outer cable lengths and then meshes of the confronting knitted wall sections of the sleeve are joined together along the middle region 14 thereof between these inner cable lengths, as by being welded together at intervals therealong. Thus, the lengths of heating cable are secured and maintained in place on the support sleeve at a desired spacing from each other, for example, at a mutual spacing of about one-half inch or a center to center distance of about one inch each from another.

Upon the cable lengths being so assembled with the support sleeve, their respective electrical resistance heating elements in end portions of them which extend beyond the opposite ends of the sleeve are passed into electrically conductive tubes of ceramic terminal blocks 6 and 7, respectively, in which they are anchored in relatively fixed positions by set screws threaded in bores of these blocks. Non-heating electrical supply conductors 1c, 2c, 3c and 4c, respectively, of low resistance extend into these same tubes from the other end of each block and are similarly anchored therein. These supply conductors at each end of the appliance are held together by an electrically insulating sleeve 8 beyond which they are joined together as indicated at 9 so that they may be readily connected in parallel with a current supply circuit, such for example, as the electrode or current output terminal of any conventional electrical welding machine.

The structure of the heating cable C provided for use in the appliance is illustrated more particularly in FIG. 4. The core 20, or resistance heating element, of the cable is a single solid strand of an electrical resistance wire such, for example, as a No. 12 gauge, or 0.081 inch diameter, wire of an alloy of 80 percent nickel and 20 percent chromium. This wire ie encased within a highly heat resistant, electrically insulating sheath having good heat conductance, as by braiding upon it four superimposed layers 21, 22, 23 and 24 of an amorphous silica fiber such as the commercial silica fiber known as "Refisil" which is resistant to temperatures as high as about 3,100° F. Then the insulating sheath is enclosed within a shielding layer of braided heat and oxidation resistant wire, as by braiding upon it a layer composed of five groups 26 of "Inconel" No. 601 chromium-nickel alloy wires, each of these groups being composed of five parallel strands of such wire of No. 32 gauge, or about 0.008 inch in diameter.

The heat treating appliance provided as herein set forth can be readily flexed by hand and wrapped spirally upon and about a welded steel pipe or like structure and then connected in an electrical supply circuit of suitably low voltage and high amperage, for the efficient performance of stress relieving heat treatments. It will readily develop an extremely high temperature, up to about 2,000° F. or even higher if desired, in the regions of the pipe on other structure upon which it is wrapped. It is entirely resistant to oxidation or other deterioration at these temperatures, and also to becoming broken or damaged under the mechanical stresses of being wrapped about a pipe for use and of being coiled into a compact form for storage or transport when not in use.

For relieving stresses in a massive steel pipe adjacent to a welded joint thereof, such as in a pipe of 48-inch outside diameter having a wall 5 ½ inches thick, several units of the heat treating appliance, each for example of about 20 feet in length, are wrapped side-by-side spirally upon and about the stressed region of the pipe adjacent to the welded joint. The several units are connected in parallel in a suitable electrical supply circuit and then are covered by a heat-insulating blanket, such as by wrapping a web of a "Kaowool" insulating material over them, to conserve the heat they will generate. The stress relieving treatment then is carried out over a period of hours by a regulated course of energization of the heating appliances, according to conditions established by engineering codes for the type of pipe being treated. Typically, the stressed region of the pipe is heated gradually in specified stages to a specified high temperature suited for normalizing its metal structure, then is caused to cool gradually at a controlled rate until a non-stressing temperature, for example of 600° F. or less, is reached.

For stress-relieving smaller pipe, such, for example, as welded steel pipe of 10-inch O.D. having a wall three-fourths inch thick, a single unit of the heat treating appliance may be wrapped spirally about the stressed region of the pipe. A typical manner of applying the heating appliance to such pipe is illustrated schematically in FIG. 5. Again, a heat-insulating blanket (not shown) is wrapped over the appliance before the heat treating cycle is initiated, and the heat treating cycle is carried out according to prescribed standards.

I claim:

1. A heating appliance adapted to be wrapped in contiguous coils about a steel pipe or like structure and heated by electrical resistance to bring the structure to a normalizing temperature in the range of about 1,100 to 1,800° F., comprising an elongate flexible reticular support resistant to all temperatures of said range, said support being flexible in all directions transverse to its longitudinal axis, a plurality of lengths of a pliable electrical heating cable disposed along and held in substantially parallel relation by said support, each of said cable lengths comprising an electrical heating element composed of an alloy suited for being heated by electrical resistance to a temperature above said range and, on said element, an electrically insulating sheath resistant to its heating temperature, said support being a knitted sleeve of heat resistant wire having said lengths of cable disposed therewithin and laterally spaced apart between opposite knitted wall sections thereof, and means for connecting the ends of the respective heating elements of said cable lengths in parallel in a circuit containing a source of electric current.

2. A heating appliance according to claim 1, said wall sections being joined together along respective longitudinal regions thereof between said cable lengths so that said cable lengths are held laterally spaced apart within said sleeve.

3. A heating appliance according to claim 2, said wall sections being so joined together by welds formed therebetween at intervals along said regions thereof.

4. A heating appliance according to claim 1, said heating element being a single solid strand of electrical resistance wire, said sheath comprising several superimposed layers of amorphous silica fiber braided upon said element, and said cable having a shielding layer of heat-and oxidation-resistant wire braided upon said sheath.

5. A heating appliance according to claim 1, the wire of said sleeve being a heat-resistant nickel-chromium alloy wire, said heating element being a single strand of a chromium-nickel electrical resistance wire, said sheath comprising several superimposed layers of amorphous silica fiber braided upon said resistance wire, and said cable having a shielding layer of heat-resistant nickel-chromium alloy wire braided upon said sheath.

6. A pliable electrical heating cable for an appliance according to claim 1, comprising a heating element composed of a single solid strand of electrical resistance wire, an electrically insulating sheath comprising several superimposed layers of amorphous silica fiber braided upon said element, and a shielding layer of heat-resistant wire braided upon said sheath.

7. A heating cable according to claim 6, said strand being composed of a chromium-nickel electrical resistance alloy and the wire of said shielding layer being a heat-resistant nickel-chromium alloy wire.

8. A heating appliance adapted to be wrapped in contiguous coils about a steel pipe or like structure and heated by electrical resistance to bring the structure to a normalizing temperature in the range of about 1,100° to 1,800° F., comprising an elongate flexible reticular support resistant to all temperatures of said range, said support being flexible in all directions transverse to its longitudinal axis, a plurality of lengths of a pliable electrical heating cable disposed along and held in substantially parallel relation by said support, each of said cable lengths comprising an electrical heating element composed of an alloy suited for being heated by electrical resistance to a temperature above said range and, on said element, an electrically insulating sheath resistant to its heating temperature, said support being a knitted sleeve of heat resistant wire having said lengths of cable disposed therewithin and laterally spaced apart between opposite knitted wall sections thereof, and means for connecting the ends of the respective heating elements of said cable lengths in parallel in a circuit containing a source of electric current, said wall sections being joined together by welds formed between them at intervals along respective longitudinal regions thereof between said cable lengths, said heating element of each said cable length being a single solid strand of electrical resistance wire, said sheath thereof comprising several superimposed layers of amorphous silica fiber braided upon said resistance wire, and a shielding layer of heat- and oxidation- resistant wire braided upon said sheath.

* * * * *